May 19, 1953 G. H. McGOWAN 2,638,847
RATIO DRIVE FOR METERING OR PROPORTIONING PUMPS
Filed Jan. 2, 1947
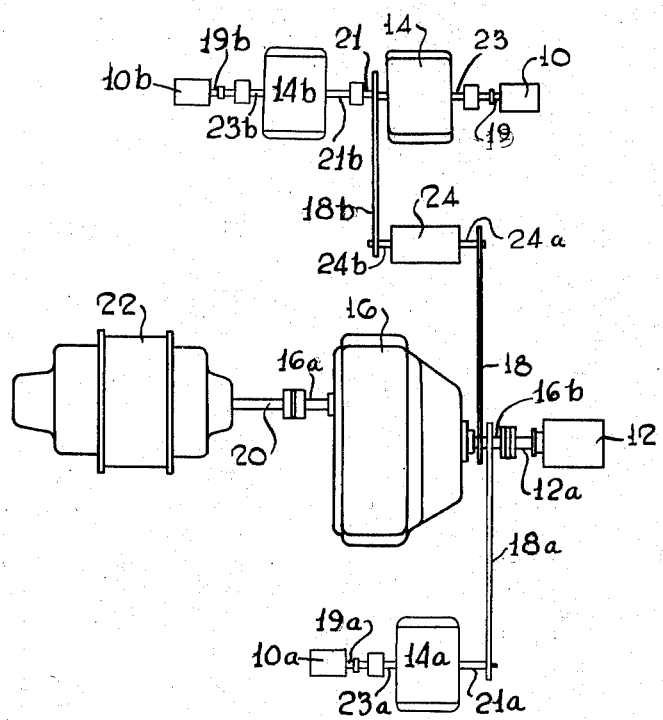
Gaylon H. Mc. Gowan Inventor
By _____ Attorney Patented May 19, 1953

2,638,847

UNITED STATES PATENT OFFICE 2,638,847

RATIO DRIVE FOR METERING OR PROPORTIONING PUMPS

Gaylon H. McGowan, Fanwood, N. J., assignor to Standard Oil Development Company, a corporation of Delaware Application January 2, 1947, Serial No. 719,703

1 Claim. (Cl. 103—6)

This invention relates to devices for the preparation of mixtures and in particular to metering or proportioning pumps employed in the mixing of multi-component mixtures.

In industries in which at least several constituents are to be mixed, individual controls upon the separate supply systems for each of the constituents usually are employed. Control in the case of reciprocating or rotary pumps in each system may be accomplished either by varying the stroke of a proportioning pump operating at a constant speed for example, or by varying the speed of the pump and maintaining the stroke constant. Thus, when the proportions in a mixture must be varied from time to time, it is necessary to make individual changes in the capacities of each of the supply systems either by varying the stroke or by varying the speed of the individual pumps. It therefore becomes necessary to make individual pump adjustments when either quantity or ratio of components is required. In the case of metering pumps each supply system involves a separate drive, a separate variable speed unit and a separate pump. In the present invention a single drive is employed and by means of this drive, two or more pumps are driven through two or more variable speed transmissions connected together by belts, chains or such interconnecting means.

An object of this invention is to furnish a single unit to control the total quantity of a mixture and coupled with a simple means of varying the proportion between two or more of the constituents. Another object of the invention is to regulate the total output capacity of all pumps in the system. A further object of the invention is to effect variation in total capacity of the mixing system by simple regulation of one variable speed transmission operated from a single driver mechanism. Other objects will be appreciated by the following description and illustration of a particular embodiment.

In the embodiment of the invention as illustrated in the drawing, the output driving shaft 20 of a driver 22 is shown as directly connected to the input driven shaft 16a of a variable speed transmission means 16. The output driving shaft 16b of this transmission means is in turn directly connected to the input driven shaft 12a of a primary pump element 12. The shaft 16b forms the main driving shaft for the pump system provided. In addition to the pump element 12, a series of secondary pump elements 10, 10a, and 10b is provided, each element having an input driven shaft 19, 19a, and 19b respectively. A corresponding series of secondary variable speed transmission means 14, 14a, and 14b is provided also, each having input driven shafts 21, 21a, and 21b, and output driving shafts 23, 23a, and 23b respectively, the input driven shafts being driven from the main driving shaft 16b as through driving means 18, 18a, and 18b shown.

In the system as shown in the drawing, the input driven shafts 21 and 21b of transmission means 14 and 14b are directly interconnected. Also, there is provided a supplemental variable speed transmission 24 which is shown disposed intermediate the output driving shaft 16b of the transmission means 16 and the interconnected input driven shafts 21 and 21b of the secondary transmission means 14 and 14b. The supplementary transmission means 24 has an input driven shaft 24a connected to the main drive shaft 16b as by a belt driving means 18, and an output driving shaft 24b connected to the interconnected input shafts 21 and 21b as by a belt driving means 18b. The input shaft 21a of transmission means 14a is separately connected to the main drive shaft 16b as by a belt driving means 18a.

In the embodiments of the invention as illustrated and described, all pump elements in the system are operated by a single driver, a primary pump element is driven directly from a primary variable speed transmission means, while a series of secondary pump elements is driven indirectly thereby, through a series of secondary variable speed transmission means. Of the secondary variable speed transmission means, at least two are directly interconnected and indirectly driven through a supplemental variable speed transmission means from the primary transmission means, while at least one other secondary transmission means is driven through a drive means directly connected to the output driving shaft of the primary transmission means.

In operation, therefore, the capacity or output of the entire system may be varied by varying the output of the primary transmission means, while maintaining the proportional output relationship of the secondary pump elements to the output of the primary pump element; the capacity of the secondary pump elements driven through the interconnected secondary transmission means may be jointly varied with respect to that of other pump elements in the system, by varying the output of the supplement transmission means, while maintaining their proportional output relationship to each other; and the individual output of any secondary pump element may be varied by means of the secondary transmission means directly connected to and driving that pump element.

What is claimed is:

A proportioning pump system comprising a common driving means for the system; a primary variable speed transmission means having an input shaft connected to and driven by said driving means, and an output driving shaft, said output shaft constituting the main drive shaft for said system; a primary pump element having an input driven shaft, said shaft being directly connected to said main drive shaft; a series of secondary pump elements in said system; each having an input driven shaft; a series of secondary variable speed transmission means in said system, each having an input driven shaft and an output driving shaft, each one of the latter mentioned output shafts being directly connected to an input shaft of one of said series of secondary pump elements, said series of secondary transmission means including at least two transmission means which are directly interconnected by means of their input shafts, and at least one other transmission means in said series; a supplemental variable transmission means in said system having an input, driven shaft, and an output, driving shaft; drive means directly connected between said supplemental transmission means output shaft and said interconnected secondary transmission means input shafts; drive means directly connected between said supplemental transmission means input shaft and said main drive shaft; and drive means directly connected between said main drive shaft and the input shaft of at least one other member of said series of secondary transmission means; whereby the pumping rate of any secondary pump element may be individually varied with respect to that of said primary pump element as well as to that of any other secondary pump element; the combined pumping rate of said secondary pump elements driven by said interconnected secondary transmission means through said supplemental transmission means may be jointly varied with respect to that of said other pump elements while maintaining their proportional output relation to each other, and the combined pumping rate of all pump elements may be uniformly varied while maintaining their proportional output one to another.

GAYLON H. McGOWAN.

References Cited in the file of this patent

UNITED STATES PATENTS

| Number    | Name              | Date          |
|-----------|-------------------|---------------|
| 537,384   | Cook              | Apr. 9, 1895  |
| 828,313   | Higginson         | Aug. 14, 1906 |
| 1,012,687 | Melton            | Dec. 26, 1911 |
| 1,492,271 | Snyder            | Apr. 29, 1924 |
| 1,652,026 | Loffler           | Dec. 6, 1927  |
| 1,872,503 | Repschleger et al.| Aug. 16, 1932 |
| 1,961,350 | Grunsky           | June 5, 1934  |
| 2,036,810 | Hurrell           | Apr. 7, 1936  |
| 2,312,111 | McKinnis          | Feb. 23, 1943 |
| 2,354,634 | Griswold          | July 25, 1944 |
| 2,376,917 | Hiltz             | May 29, 1945  |